(12) United States Patent
Lin

(10) Patent No.: US 12,664,427 B2
(45) Date of Patent: Jun. 23, 2026

(54) DATA PROCESSING APPARATUS FOR A VEHICLE HAVING A PLURALITY OF SENSORS

(71) Applicant: Yinwang Intelligent Technologies Co., Ltd., Shenzhen (CN)

(72) Inventor: Hsiao-Ying Lin, Singapore (SG)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 673 days.

(21) Appl. No.: 18/154,148

(22) Filed: Jan. 13, 2023

(65) Prior Publication Data

US 2023/0169343 A1        Jun. 1, 2023

Related U.S. Application Data

(63) Continuation of application No. PCT/CN2020/102868, filed on Jul. 17, 2020.

(51) Int. Cl.
*G06N 3/08* (2023.01)
*G06F 9/455* (2018.01)

(52) U.S. Cl.
CPC ........... *G06N 3/08* (2013.01); *G06F 9/45558* (2013.01); *G06F 2009/4557* (2013.01)

(58) Field of Classification Search
CPC ...... G06N 3/08; G06N 3/045; G06F 9/45558; G06F 2009/4557; B60W 50/0098; B60W 2050/0006; B60W 60/00
See application file for complete search history.

(56) References Cited

U.S. PATENT DOCUMENTS

| | | | |
|---|---|---|---|
| 6,889,171 | B2 | 5/2005 | Skrbina et al. |
| 10,242,665 | B1 | 3/2019 | Abeloe |
| 10,503,174 | B1 | 12/2019 | Kim et al. |
| 10,627,820 | B1 | 4/2020 | Abeloe |

(Continued)

FOREIGN PATENT DOCUMENTS

| | | |
|---|---|---|
| CN | 107783818 A | 3/2018 |
| CN | 108108766 A | 6/2018 |

(Continued)

OTHER PUBLICATIONS

Abuadbba, Can We Use Split Learning on 1D CNN Models for Privacy Preserving Training?, pp. 1-13, Mar. 16, 2020.*

(Continued)

*Primary Examiner* — Albert M Phillips, III
(74) *Attorney, Agent, or Firm* — Leydig, Voit & Mayer, Ltd.

(57)        ABSTRACT

A data processing apparatus for an intelligent vehicle has a plurality of virtual machines disposed therein, and a first neural network model corresponding to a sensor group in a machine learning model is disposed in one virtual machine. The machine learning model performs calculation on detection data of a corresponding sensor group in an independent virtual machine. Subsequently, all first neural network models in the plurality of virtual machines send output results of detection data of a plurality of sensor groups to a second neural network model, and the second neural network model obtains, based on the plurality of output results, a fusion output result used to indicate vehicle driving parameter information.

18 Claims, 9 Drawing Sheets

(56) References Cited

U.S. PATENT DOCUMENTS

| | | | |
|---|---|---|---|
| 2017/0372201 A1 | 12/2017 | Gupta et al. | |
| 2019/0155633 A1 | 5/2019 | Faulhaber, Jr. et al. | |
| 2019/0325302 A1 | 10/2019 | Savic et al. | |
| 2020/0050208 A1* | 2/2020 | Frick ...................... | G06V 20/64 |
| 2020/0250510 A1* | 8/2020 | Kumar Addepalli .. | G06N 3/084 |

FOREIGN PATENT DOCUMENTS

| | | |
|---|---|---|
| CN | 108196535 A | 6/2018 |
| CN | 108594819 A | 9/2018 |
| CN | 109993684 A | 7/2019 |
| CN | 110619229 A | 12/2019 |
| CN | 110674941 A | 1/2020 |
| CN | 111079475 A | 4/2020 |
| CN | 111105006 A | 5/2020 |
| CN | 111382868 A | 7/2020 |
| CN | 111399853 A | 7/2020 |
| WO | 2019094843 A1 | 5/2019 |

OTHER PUBLICATIONS

Meng, A survey on machine learning for data fusion, pp. 115-129, Dec. 10, 2019.*

Lu Feng et al.,"Obstacle detection method based on fusion information", Journal of Computer Applications, Coden Jyiidu, ISSN 1001 9081, Dec. 20, 2017, with an English abstract, total 5 pages.

SuRak Son et al.,"A Driving Decision Strategy(DDS) Based on Machine learning for an autonomous vehicle", 2020 IEEE, Total 3 Pages.

Liu Yang et al: "An Ensemble Convolutional Neural Networks for Bearing Fault Diagnosis Using Multi-Sensor Data", Sensors, vol. 19, No. 23, Dec. 2, 2019 (Dec. 2, 2019), pp. 1-20, XP093039563, Total 20 pages.

Peter M. VanNostrand et al.,"Confidential Deep Learning: Executing Proprietary Models on Untrusted Devices", arXiv:1908. 10730v1 [cs.CR] Aug. 28, 2019, Total 6 Pages.

Hsiao-Ying Lin et al.,"Bident Structure for Neural Network Model Protection", DOI: 10.5220/0008923403770384, Proceedings of the 6th International Conference on Information Systems Security and Privacy (ICISSP 2020), pp. 377-384, total 8 pages.

Zhang Kexin,"Techincal Research on Intelligent Traffic Signal Timing Optimization Based on Deep Reinforcement Learning", Shenyang University of Science and Technology, 2020 Issue 03, With an English Abstract, Total 67 Pages.

Xiaozhi Chen et al.,"Multi-View 3D Object Detection Network for Autonomous Driving", arXiv:1611.07759v3 [cs.CV] Jun. 22, 2017, Total 9 Pages.

Xu Kuangzheng,"Research on Vehicle Detection and Tracking Based on Heterogeneous Computing", Xidian University, 2020 Issue 02, With an English Abstract, Total 77 Pages.

Xuhui Chen et al.,"SecureNets: Secure Inference of Deep Neural Networks on an Untrusted Cloud", Proceedings of Machine Learning Research 95:646-661, 2018, ACML 2018, Total 16 Pages.

Florian Tram r et al.,"Slalom: Fast, Verifiable and Private Execution of Neural Networks in Trusted Hardware", arXiv:1806.03287v2 [stat.ML] Feb. 27, 2019, Total 19 Pages.

* cited by examiner

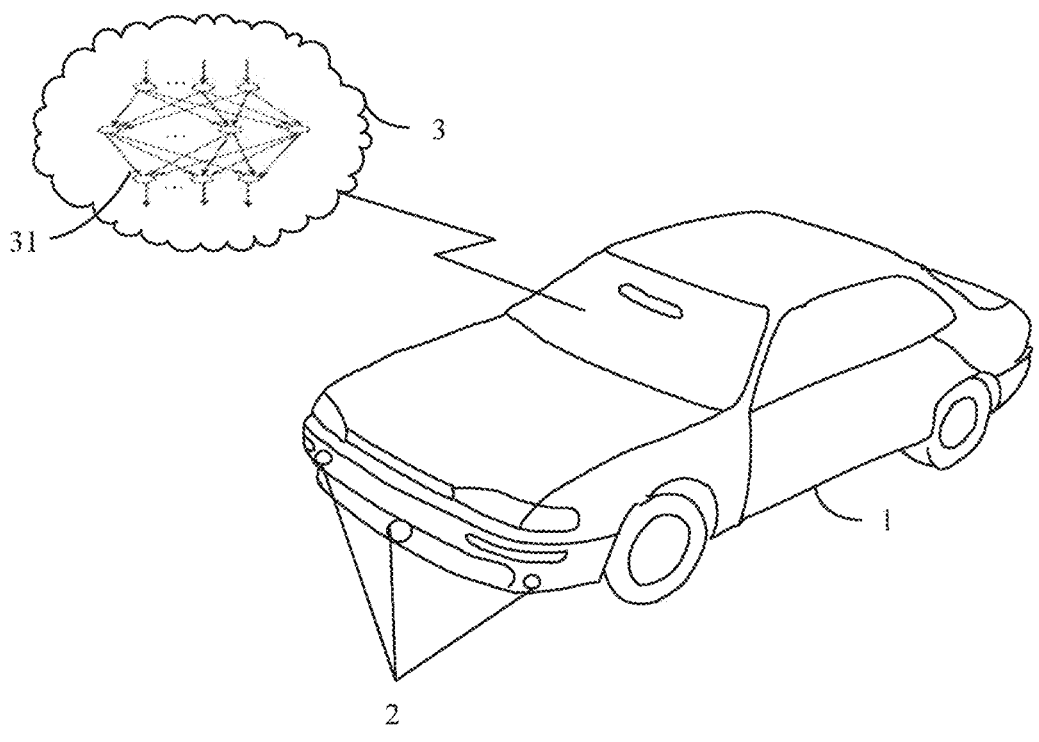
Prior Art FIG. 1
Input layer          Intermediate layer          Output layer
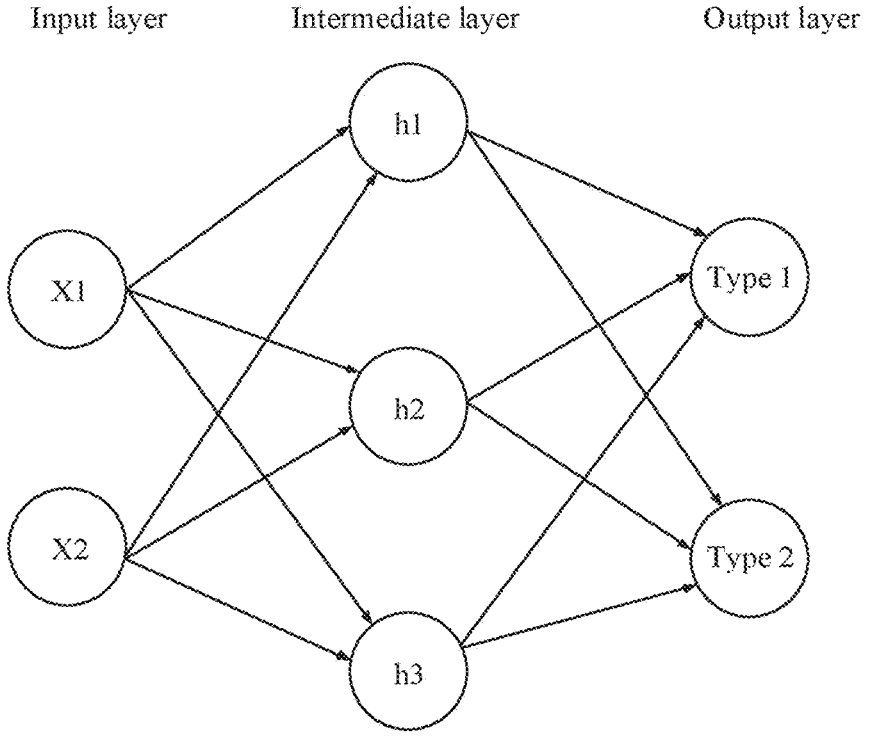
Prior Art FIG 2

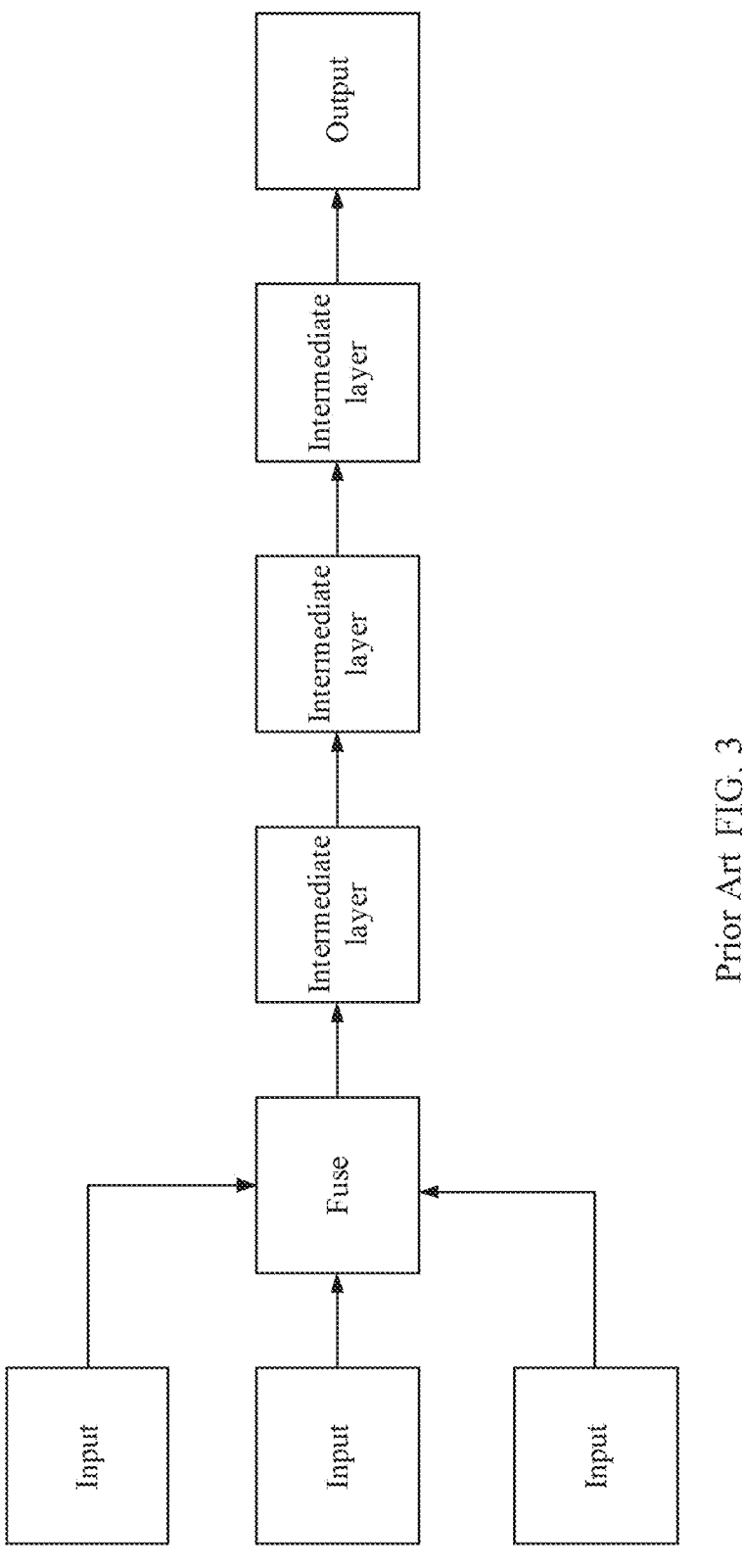
Prior Art FIG. 3

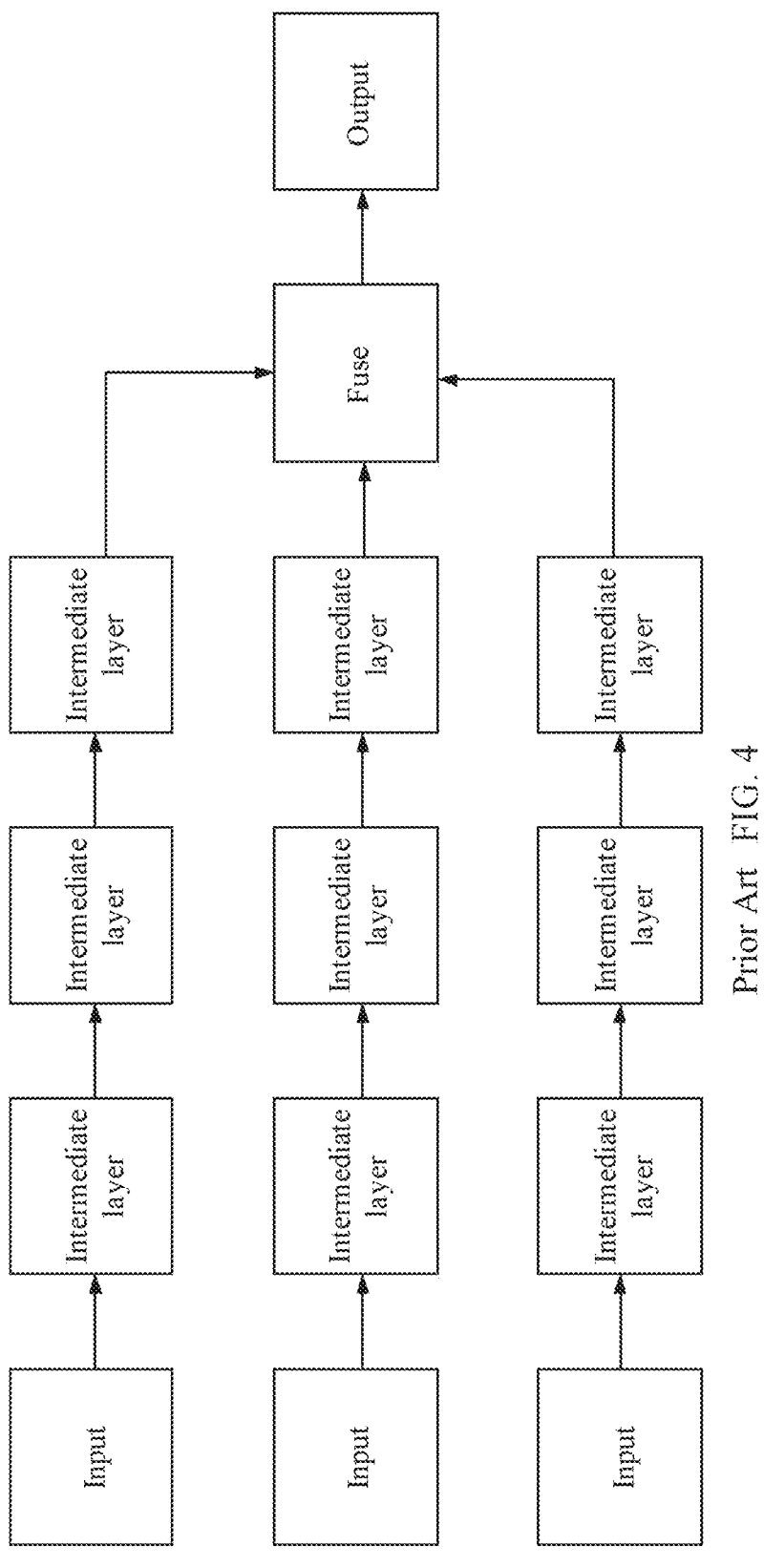
Prior Art  FIG. 4

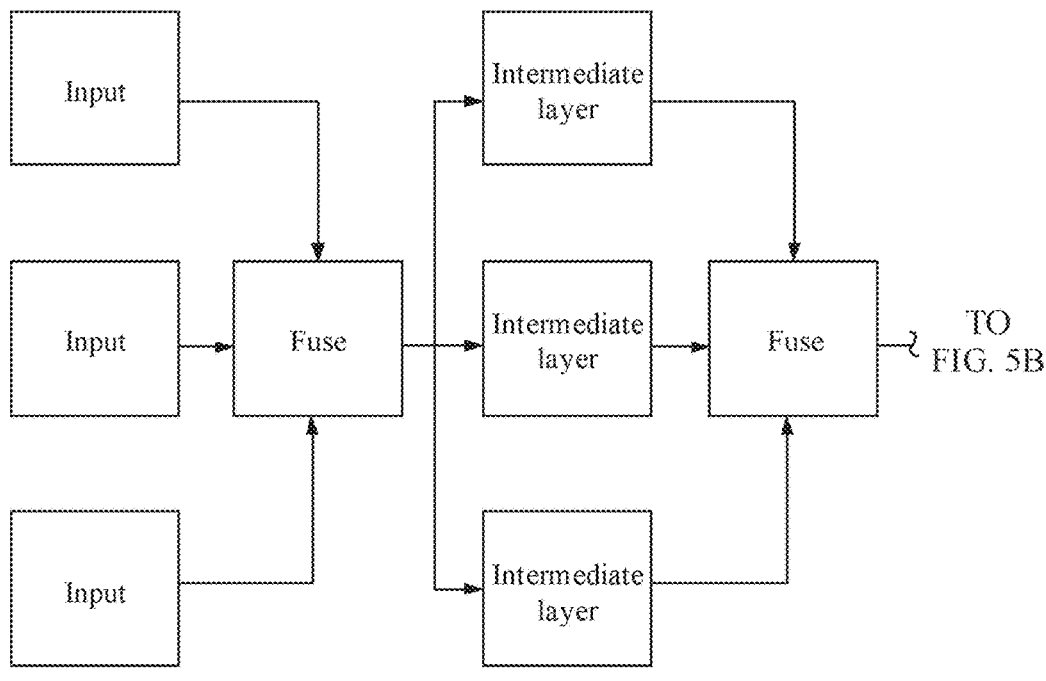
Prior Art FIG. 5A
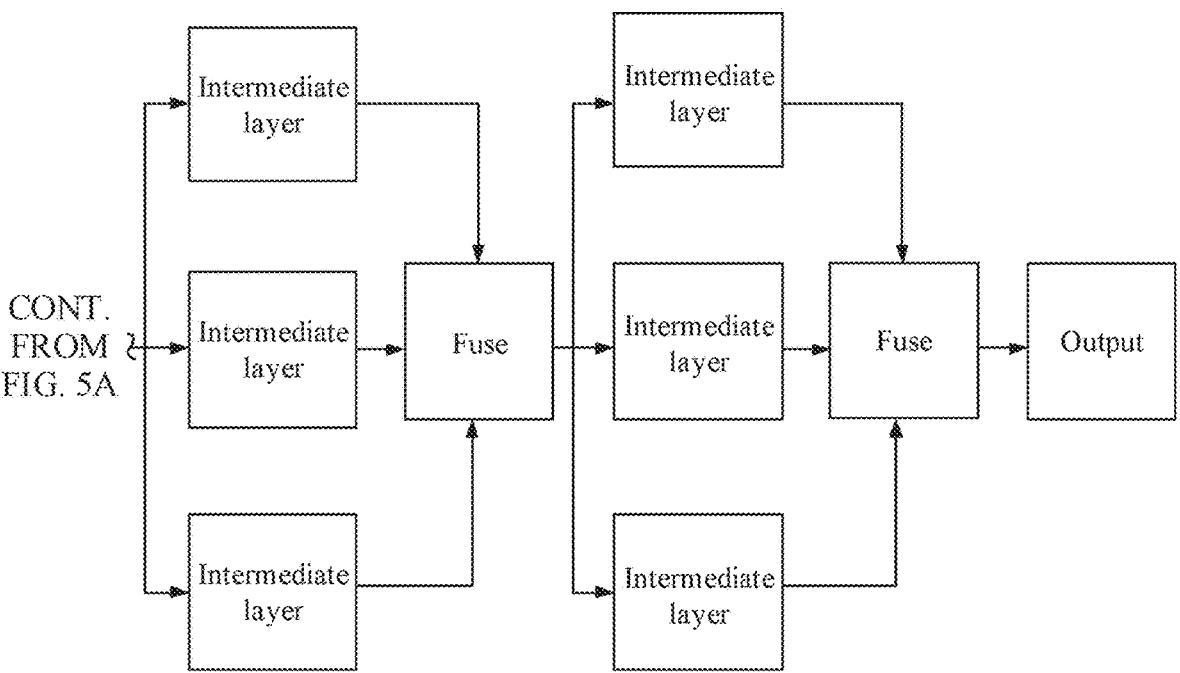
Prior Art FIG. 5B

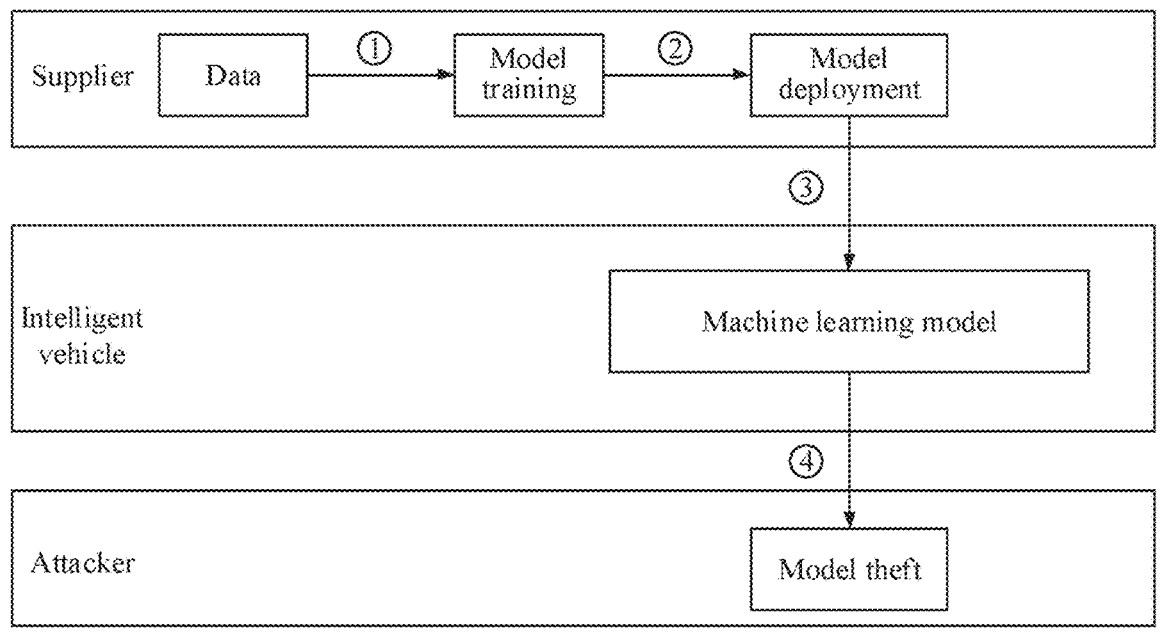
Prior Art FIG. 6
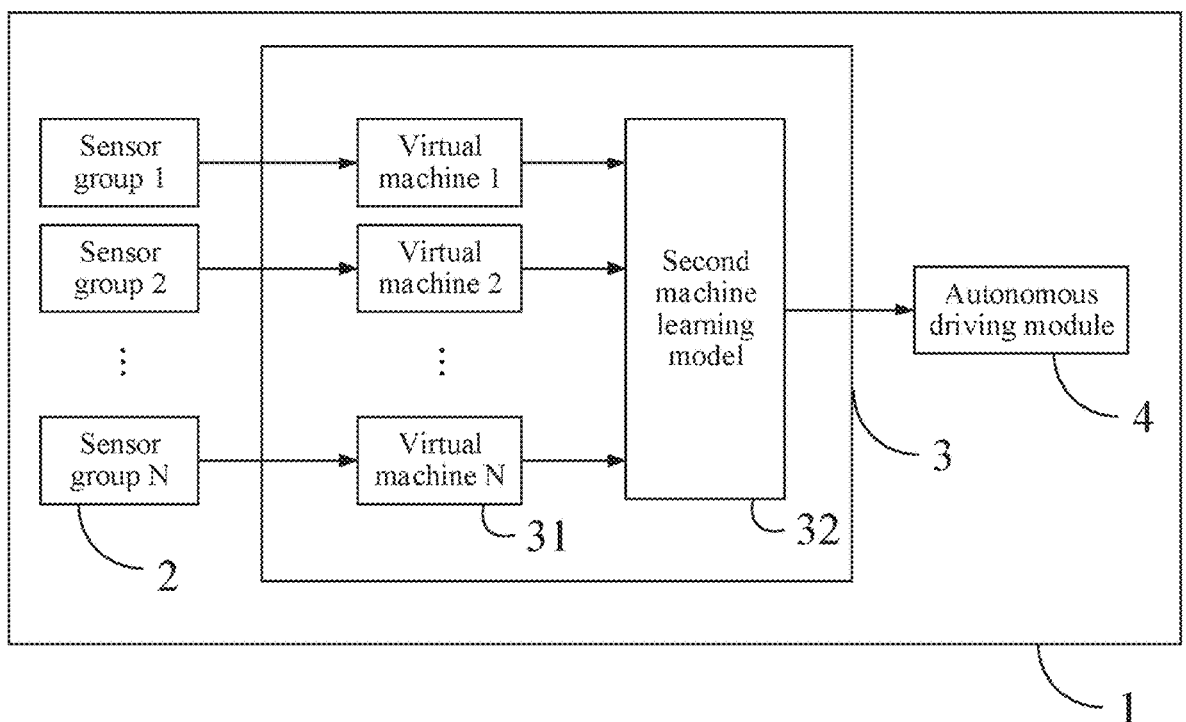
FIG. 7

Obtain, by using a plurality of virtual machines, detection data of a sensor group corresponding to each virtual machine    S101

Obtain a plurality of output results by using the detection data of the sensor group corresponding to each virtual machine as an input of a first machine learning model in the virtual machine    S102

Obtain a fusion output result by using the plurality of output results of first machine learning models in the plurality of virtual machines as inputs of a second machine learning model    S103

FIG. 14

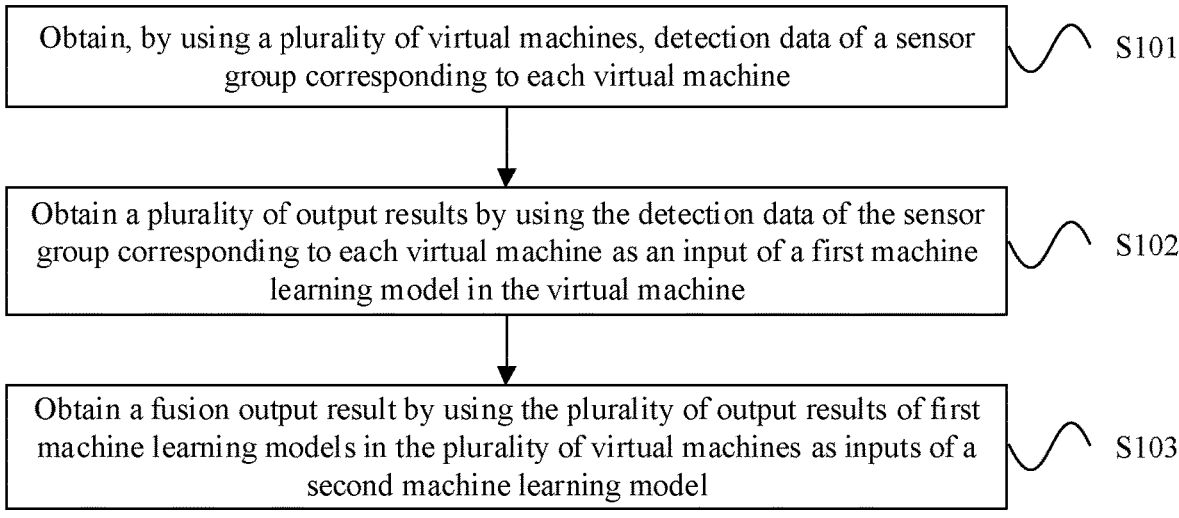

1500

1510    1520

Communication interface

Processor

1530

Memory

FIG. 15

DATA PROCESSING APPARATUS FOR A VEHICLE HAVING A PLURALITY OF SENSORS

CROSS-REFERENCE TO RELATED APPLICATION

This application is a continuation of International Application PCT/CN2020/102868,filed on Jul. 17, 2020, which is incorporated herein by reference in its entirety.

TECHNICAL FIELD

This application relates to the field of Internet of Vehicles technologies, and in particular, to a data processing method and apparatus, and an intelligent vehicle.

BACKGROUND

With continuous development of electronic technologies and automotive technologies, more vehicles have a driver assistance function. To implement the driver assistance function, various types of sensors such as a camera, lidar, and radar are usually installed on a vehicle. After detection data of ambient environment information of the vehicle is collected by the sensors, an in-vehicle terminal disposed in the vehicle uses the detection data as an input of a machine learning model, and after further analysis and processing, outputs information that can be used to control the vehicle to adjust driving parameters to implement driver assistance. In addition, the machine learning model used by the in-vehicle terminal to analyze sensor data is usually provided by a supplier of the in-vehicle terminal. However, obtaining the machine learning model is laboring- and cost-consuming for the supplier. For example, after experimenters drive vehicles on roads to collect actual road data as samples, a machine learning model that can be applied to the in-vehicle terminal is obtained through a large amount of training and calculation.

In the current technology, to ensure security of the machine learning model in the in-vehicle terminal, and to prevent economic losses caused by theft of the machine learning model, and potential security risks, brought to other vehicles, resulting from forging of the machine learning model, the supplier of the in-vehicle terminal uses some technologies to ensure the security of the machine learning model. For example, in a technology, the supplier sets an encryption parameter for the machine learning model disposed in the in-vehicle terminal, encrypts the machine learning model, and then deploys the machine learning model into the in-vehicle terminal. However, in this technology, encryption and decryption are performed in each step of calculation of the machine learning model, increasing calculation overheads of the machine learning model and causing a great processing delay. Alternatively, in another technology, the machine learning model is stored in a dedicated trusted execution environment (TEE), but this technology is restricted by computing power and space of the TEE. Only part of ongoing calculation of the machine learning model can be extracted from the TEE to be performed in a general environment each time, and a calculation result needs to be returned to the TEE after the calculation is completed, thereby increasing a quantity of interactions between the TEE and the general environment during the calculation of the machine learning model, and also causing a processing delay.

Therefore, how to ensure the security of the machine learning model in the in-vehicle terminal without increasing the calculation overheads and the delay of the machine learning model is a technical problem to be resolved in this field.

SUMMARY

This application provides a data processing method and apparatus, and an intelligent vehicle, to resolve a technical problem that an increase in delay cannot be avoided while security of a model in an in-vehicle terminal is ensured in the current technology. The application is defined by the attached claims.

A first aspect of this application provides a data processing apparatus. A plurality of virtual machines are disposed in the data processing apparatus, and a first neural network model corresponding to each sensor group in a machine learning model is disposed in one virtual machine, so that when the entire machine learning model performs calculation on detection data of a corresponding sensor group, the calculation is performed in an independent virtual machine without a mutual impact. All first neural network models in the plurality of virtual machines jointly output results of detection data of a plurality of sensor groups to a second neural network model, and the second neural network model finally obtains, based on the plurality of output results, a fusion output result used to indicate driving parameter information.

It can be learned that, in the data processing apparatus provided in this embodiment, the plurality of virtual machines are disposed in the data processing apparatus, and the machine learning model is split into different parts separately stored in the plurality of virtual machines, thereby increasing difficulty of breaking the data processing apparatus and obtaining the machine learning model in the data processing apparatus. An attacker needs to break all the virtual machines to obtain the machine learning model in the data processing apparatus in reverse. Therefore, protection of the machine learning model in the data processing apparatus is implemented to some extent, and security of the machine learning model is improved. In addition, a delay introduced to protect the machine learning model in this application is caused only by interaction between the virtual machines and the data processing apparatus, and the delay is small because a technology for interaction between the virtual machines and the data processing apparatus is mature. Therefore, compared with a machine learning model encryption technology, this application does not cause a significant increase in calculation overheads. Compared with running the machine learning model in a TEE, this application does not cause a significant increase in interaction. Therefore, while the security of the machine learning model in this application is improved, an introduced calculation delay is reduced. To sum up, the data processing apparatus provided in this application can ensure the security of the machine learning model without increasing excessive calculation overheads and a delay of the machine learning model.

In an embodiment of the first aspect of this application, in addition to protecting, by using the plurality of virtual machines, first machine learning models which perform calculation on the detection data of the sensor groups, the data processing apparatus protects, by using a fusion virtual machine, a second machine learning model configured to fuse output results of the plurality of virtual machines to obtain the fusion output result.

Although a delay caused by interaction between the virtual machines and the fusion virtual machine is introduced by the data processing apparatus provided in this embodiment, the delay in the data processing apparatus is still relatively small compared with that in a current technology. Therefore, by respectively putting the first machine learning models and the second machine learning model that are obtained by splitting the entire machine learning model into the different virtual machines, the security of the entire machine learning model is further ensured, and the calculation delay of the machine learning model may be reduced, compared with that in the current technology. In addition, higher security performance and specific calculation efficiency of the data processing apparatus are achieved.

In an embodiment of the first aspect of this application, the entire machine learning model in the data processing apparatus is further split into a plurality of branch neural networks and a fusion neural network, where the plurality of branch neural networks are disposed independently in the plurality of virtual machines, and are used to process the detection data of the sensor groups connected to the virtual machines to obtain the output results, and the fusion neural network is used to perform feature fusion on all the output results obtained through calculation of the branch neural networks, to obtain the fusion output result.

Therefore, in this embodiment, based on the branch networks and a fusion network of late fusion, the detection data of all the sensor groups may be separately processed by the branch neural networks, and the output results are fused. With reference to the detection data of the plurality of sensor groups, instead of depending on an output result of a sensor group, a more accurate fusion output may be obtained through feature fusion, after the output results are calculated by all the branch neural networks. In addition, after the entire machine learning model is equivalently split into the plurality of branch neural network models and one fusion neural network model, when an attacker is to steal the machine learning model stored in the data processing apparatus by a supplier, in addition to breaking an operating system of the data processing apparatus to obtain the fusion neural network model, the attacker needs to further attack the plurality of virtual machines in the data processing apparatus one by one, and steal the entire machine learning model only after the branch neural network models in all the virtual machines are obtained by breaking all the virtual machines. When a quantity of sensors is large, a quantity of virtual machines to be broken also increases, which undoubtedly increases difficulty of stealing the machine learning model, so that the attacker is less likely to steal the machine learning model in the data processing apparatus. Therefore, security performance of the machine learning model stored in the data processing apparatus is improved.

In an embodiment of the first aspect of this application, based on splitting the machine learning model into the plurality of branch neural networks and one fusion neural network, where each branch neural network only needs to process detection data of one sensor group, the branch neural networks may be provided by suppliers of the sensor groups. However, the fusion neural network needs to fuse the output results of the plurality of sensors to obtain the fusion result. Therefore, the fusion neural network may be obtained through training by a supplier of the data processing apparatus, that is, the supplier of the data processing apparatus in this embodiment.

In conclusion, in the data processing apparatus provided in this embodiment, the plurality of branch neural networks and the fusion neural network obtained by splitting the machine learning model may be provided by different suppliers respectively, thereby reducing difficulty of calculating all the machine learning models by one supplier, and improving efficiency of obtaining the machine learning model through joint calculation by the different suppliers. In addition, each supplier may perform calculation by using private training data corresponding to sensor of the supplier, and further ensure data security of each supplier.

In an embodiment of the first aspect of this application, when the suppliers of the sensors and the supplier of the data processing apparatus train their respective networks, the training data may be shared. For example, training data collected by a supplier of each sensor group is uploaded to storage space such as a server in the Internet for storage.

In conclusion, based on the training data provided in this embodiment, the suppliers of all the sensor groups may use same data to train their respective networks, so that although the entire machine learning model is split into different networks, the data used for training each network is the same, and data in an entire training process is kept consistent. Therefore, the machine learning module obtained is more accurate. In addition, the training data is shared by the different suppliers, so that a quantity of data used for machine learning model training may be enriched, manpower and material resources invested by each supplier when obtaining the training data may be reduced, and privacy of the machine learning models of the suppliers can also be ensured between the suppliers of the machine learning models corresponding to the different sensor groups.

A second aspect of this application provides a data processing method applicable to the data processing apparatus provided in the first aspect of this application. The method includes: obtaining, by using a plurality of virtual machines, detection data of a sensor group corresponding to each virtual machine, where each virtual machine includes one first machine learning model; obtaining a plurality of output results by using the detection data of the sensor group corresponding to each virtual machine as an input of the first machine learning model in the virtual machine; and obtaining a fusion output result by using the plurality of output results of the first machine learning models in the plurality of virtual machines as inputs of a second machine learning model, where the fusion output result indicates driving parameter information of an intelligent vehicle.

In an embodiment of the second aspect of this application, the second machine learning model is disposed in a fusion virtual machine; and before the obtaining a fusion output result by using the plurality of output results of the first machine learning models in the plurality of virtual machines as inputs of a second machine learning model, the method further includes: obtaining the plurality of output results of the first machine learning models in the plurality of virtual machines by using the fusion virtual machine.

In an embodiment of the second aspect of this application, the first machine learning model includes a branch neural network model, and the second machine learning model includes a fusion neural network model.

In an embodiment of the second aspect of this application, the branch neural network model included in each virtual machine is obtained through training based on a training dataset by a supplier of the sensor group corresponding to the virtual machine; and the training dataset includes a plurality of correspondences, where in each correspondence, detection data of a sensor group of the intelligent vehicle corresponds to a piece of driving parameter information.

In an embodiment of the second aspect of this application, the fusion neural network model is obtained through training based on the training dataset by a supplier of the data processing apparatus.

In an embodiment of the second aspect of this application, the correspondences included in the training dataset are provided by the supplier of the data processing apparatus and suppliers of a plurality of sensor groups.

A third aspect of this application provides an intelligent vehicle, including the data processing apparatus according to any embodiment of the first aspect of this application.

A fourth aspect of this application provides an electronic device, including a processor and a memory, where the memory stores instructions, and when the processor runs the instructions, the processor performs the method according to any embodiment of the second aspect of this application.

A fifth aspect of this application provides a storage medium, where the storage medium stores a computer program, and when the computer program is run on a computer, the computer is enabled to perform the method according to any embodiment of the second aspect of this application.

BRIEF DESCRIPTION OF DRAWINGS

FIG. 1 is a schematic diagram of an application scenario according to this application;

FIG. 2 is a schematic diagram of a structure of a machine learning model;

FIG. 3 is a schematic diagram of a structure of an early fusion branch network;

FIG. 4 is a schematic diagram of a structure of a late fusion branch network;

FIG. 5A and FIG. 5B are a schematic diagram of a structure of an intermediate deep fusion branch network;

FIG. 6 is a schematic diagram of a related scenario of machine learning model generation and application;

FIG. 7 is a schematic diagram of a structure of a data processing apparatus according to an embodiment of this application;

FIG. 14 is a schematic flowchart of a data processing method according to an embodiment of this application; and FIG. 15 is a schematic diagram of a structure of an electronic device according to an embodiment of this application.

DESCRIPTION OF EMBODIMENTS

Figure 8:
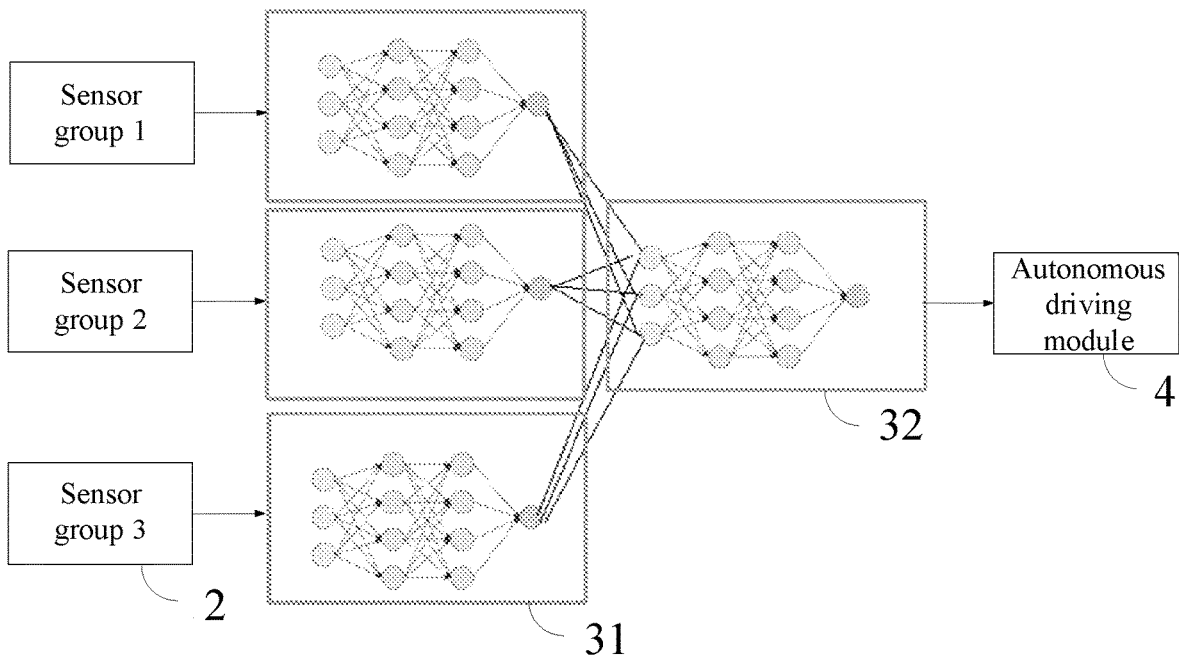
FIG. 8 is a schematic diagram of a structure of virtual machines according to this application.

Before this application is described, an application scenario and an existing problem of this application are first described with reference to the accompanying drawings.

FIG. 1 is a schematic diagram of an application scenario of this application. Specifically, in the scenario shown in FIG. 1, an intelligent vehicle 1 has a driver assistance function, and a plurality of sensors 2 are disposed on the intelligent vehicle 1, for example, an imaging sensor such as a camera, radar (radar), lidar (lidar), and an infrared sensor. These sensors 2 are disposed at different positions on the intelligent vehicle 1, and may be configured to detect an ambient environment of the intelligent vehicle 1, and generate detection data. In addition, an in-vehicle terminal 3 is further disposed on the intelligent vehicle 1, and may be configured to perform analysis by using the detection data of the plurality of sensors 2, and further perform, based on an analysis result, corresponding control on the intelligent vehicle 1, to implement various functions of assisting a driver of the intelligent vehicle 1, such as automatic braking, automatic parking assist, blind spot detection, autonomous cruise, and lane departure warning.

In addition, with continuous development of artificial intelligence (artificial intelligence, AI) technologies, a machine learning (machine learning, ML) model is widely applied to a driver assistance scenario shown in FIG. 1. The in-vehicle terminal 3 in the intelligent vehicle 1 may process the detection data of the sensors 2 by using a machine learning model 31. For example, FIG. 2 is a schematic diagram of a structure of a machine learning model. A deep learning (deep learning, DL) model in the machine learning model is used as an example. Because the deep learning model uses a neural network, the deep learning model may also be referred to as a deep neural network model. An input layer of the deep learning model includes two input values X1 and X2. Detection data obtained by two different sensors 2 disposed on the intelligent vehicle 1 may be used as inputs of the machine learning model. An intermediate layer has three neurons h1 to h3 that are used to perform calculation such as calculating an inner product of vectors and a nonlinear function on the input values of the input layer. Then two output values of an output layer represent probability values of Type 1 and Type 2, and are used as outputs of the machine learning model, where the probability values may be used to subsequently select a corresponding driving assistance control solution for the intelligent vehicle 1. It should be noted that the machine learning model shown in FIG. 2 is only used to describe a structure of the machine learning model. In a specific implementation, there may be a plurality of intermediate layers and a plurality of nodes included in each layer. This is not limited.

More specifically, because a plurality of sensors 2 are disposed on the intelligent vehicle 1, a data format input by each sensor and a data processing manner may be different. The machine learning model 31 may process detection data of the plurality of sensors 2 in a manner of fusing different branch networks, and finally obtains probability values of the output layer based on the detection data of the plurality of sensors 2, which are used to subsequently select the corresponding driving assistance control solution for the intelligent vehicle 1. A fusion manner used in the machine learning model 31 provided in this application includes early fusion, late fusion, or deep fusion.

For example, FIG. 3 is a schematic diagram of a structure of an early fusion branch network. A machine learning model uses detection data of a plurality of different sensors as inputs, first fuses the input detection data of all the plurality of sensors by using the fusion network, then processes fused detection data by using a plurality of intermediate layers, and finally outputs an output result that is obtained after all the input detection data is fused, and then processed by the intermediate layer. FIG. 4 is a schematic diagram of a structure of a late fusion branch network. A machine learning model uses received detection data of different sensors as inputs of a plurality of input layers, separately performs processing by using intermediate layers, then fuses all intermediate layer output results of the detection data by using the fusion network, and finally outputs an output result obtained by fusing all the detection data that is processed by the intermediate layers. FIG. 5A and FIG. 5B are a schematic diagram of a structure of an intermediate deep fusion branch network. A machine learning model uses detection data of a plurality of different sensors as inputs, and after performing cyclically intermediate layer calculation and fusion processing on data of a plurality of input layers many times, outputs an output result that combines all the input detection data and that is obtained after many times of intermediate layer processing and fusion.

In the scenario shown in FIG. 1, the machine learning model 31 may be provided by a supplier of the in-vehicle terminal 3. For example, FIG. 6 is a schematic diagram of a related scenario of machine learning model generation and application. In step ☐, to obtain more authentic and effective training data, a staff member of the supplier collects test data by driving an intelligent vehicle on a road. For example, the staff member collects detection data of sensors in different road conditions as inputs of the machine learning model 31. In addition, driving parameter information corresponding to driver assistance policies that need to be performed in the foregoing different road conditions is collected or manually marked, and used as an output of the machine learning model 31. Subsequently, by using the known detection data as input data and the known driving parameter information as output data, learning training is performed on intermediate layers of the machine learning model 31 in step ☐, to obtain the machine learning model 31 that can be used. Finally, in step ☐, the supplier may store the machine learning model 31 in the in-vehicle terminal 3 of the intelligent vehicle 1, so that the intelligent vehicle that stores the machine learning model 31 may use the model. Detection data obtained in real time by the sensors of the intelligent vehicle is used as inputs of the machine learning model, and real-time driving parameter information corresponding to the detection data is output, to implement the driver assistance function in the scenario shown in FIG. 1.

To improve performance of the machine learning model 31 when providing the driver assistance function, the supplier invests a lot of manpower and material resources, and collects a large amount of test data in step ☐, to cover more possible driving scenarios and collect road conditions in more diversified driving scenarios. In addition, much time and high calculation costs are required in step ☐ to repeatedly analyze and calculate the large amount of test data collected in step ☐, and then the machine learning model 31 that may be deployed in the intelligent vehicle 1 is finally obtained. However, in the scenario shown in FIG. 6, the machine learning model 31 stored in the in-vehicle terminal 3 of the intelligent vehicle 1 makes it possible for some illegal attackers to steal the machine learning model 31 through various software systems and hardware interfaces provided by the in-vehicle terminal 3. An attacker may steal the machine learning model 31 stored in the in-vehicle terminal 3 after breaking the in-vehicle terminal 3, and then forge and copy the stolen machine learning model 31 on another vehicle for profit. In addition to causing economic losses to the supplier by stealing the machine learning model 31 provided by the supplier, the attack that may be carried out by the attacker may also bring a great safety hazard to driving of the vehicle because the machine learning model 31 copied to another vehicle lacks services such as follow-up support and update. Therefore, to prevent the machine learning model 31 deployed in the in-vehicle terminal 3 from being stolen easily by the attacker, the supplier may protect the machine learning model 31 in a manner of encryption, setting a security environment, or the like.

For example, in a first current technology, a supplier sets a dedicated encryption parameter for a machine learning model disposed in an in-vehicle terminal, encrypts the machine learning model as a whole, and then deploys the machine learning model into the in-vehicle terminal, so that even if an attacker breaks the in-vehicle terminal, specific content of the machine learning model that is stored in the in-vehicle terminal cannot be directly determined. However, in the first technology, an encryption manner used for the machine learning model is usually a homomorphic encryption algorithm which incurs high calculation overheads, increases a data volume of the machine learning model, and further affects calculation precision of the machine learning model. Therefore, performance of implementing the driver assistance function by the machine learning model is affected.

In a second current technology, a machine learning model may be stored in a trusted execution environment (TEE) in an in-vehicle terminal, so that due to a mature TEE technology, even if an attacker breaks the in-vehicle terminal, the machine learning model stored in the TEE cannot be further obtained. However, because a data volume of the machine learning model is large, and computing power and storage space of the TEE are very limited, calculation of the machine learning model needs to be actually performed in a rich execution environment (REE) outside the TEE. In a first calculation method, for example, when the machine learning model 31 shown in FIG. 2 performs each calculation corresponding to an arrow in FIG. 2, data that needs to be used for each calculation corresponding to an arrow is separately sent to the rich execution environment. After a calculation result is obtained in the rich execution environment, the calculation result is returned to the TEE, so that the machine learning model 31 obtains the calculation result. In a second calculation method, also for the machine learning model shown in FIG. 2, calculation of some nodes in the machine learning model 31 is sent to the rich execution environment each time in a specific manner, for example, a sequence of the nodes. Results of the some nodes are calculated in the rich execution environment and returned to the TEE. However, in the foregoing second current technology, both the two calculation methods cause a significant increase in data exchange between the TEE and the rich execution environment, thereby increasing time overheads of calculation performed by the machine learning model and further increasing a delay in implementing the driver assistance function by the machine learning model.

In conclusion, in the existing methods for protecting the machine learning model in the in-vehicle terminal, while protection is implemented, extra time overheads of the calculation of the machine learning model are incurred, a delay in implementing the driver assistance function by the machine learning model is increased accordingly, and finally performance of implementing the driver assistance function by the in-vehicle terminal is affected. Therefore, how to protect the machine learning model in the in-vehicle terminal without increasing the time overheads of the calculation of the machine learning model is a technical problem to be resolved in this field.

This application provides a data processing method and apparatus, and an intelligent vehicle. A machine learning model disposed in an in-vehicle terminal of the intelligent vehicle is split into a plurality of parts which are stored in a plurality of different virtual machines respectively, so that the parts stored in the different virtual machines run independently while protection is provided, to implement a technical effect of protecting the machine learning model without increasing the time overheads of the calculation of the machine learning model. Specific embodiments are used below to describe in detail the technical solutions in this application. The following several specific embodiments may be combined with each other, and a same or similar concept or process may not be described repeatedly in some embodiments.

FIG. 7 is a schematic diagram of a structure of a data processing apparatus according to an embodiment of this application. FIG. 7 shows a structure of the intelligent vehicle 1 in the scenario shown in FIG. 1 and a structure of a data processing apparatus 3 specifically disposed in the intelligent vehicle 1. The intelligent vehicle 1 shown in FIG. 7 includes: a plurality of sensors, the data processing apparatus 3, and an autonomous driving module 4.

Each sensor 2 may be disposed on a vehicle body of the intelligent vehicle 1, and is configured to detect ambient environment information of a current location of the intelligent vehicle 1, and generate detection data. For example, the sensors include: an imaging sensor such as a camera, radar, lidar, an infrared sensor, and the like. In this embodiment of this application, the plurality of sensors disposed on the intelligent vehicle 1 may be classified into different sensor groups. For example, in FIG. 7, the sensors disposed on the intelligent vehicle 1 are classified into N different sensor groups, where N>1, and each sensor group may include one or more sensors. A specific basis for classifying the different sensor groups is not limited in this embodiment of this application. For example, based on a format of collected data, a sensor such as the camera or the laser radar that is disposed on the intelligent vehicle 1 and that is configured to collect image data may be classified as a sensor group 1, and a sensor such as a GPS or infrared radar configured to measure a distance to obtain distance data may be classified as a sensor group 2; or based on a position of a sensor, a sensor disposed in the front of the intelligent vehicle 1 may be classified as the sensor group 1, and a sensor disposed at the rear of the intelligent vehicle 1 may be classified as the sensor group 2.

The data processing apparatus 3 may be the in-vehicle terminal shown in FIG. 1, or may be an apparatus in the in-vehicle terminal. The data processing apparatus is configured to output information to the autonomous driving module 4 after processing detection data input by the N groups of sensors 2, where the information may be used to indicate driving parameter information of the intelligent vehicle.

The autonomous driving module 4 may be configured to adjust a driving parameter, for example, a speed and a direction of the intelligent vehicle 1, to implement a driver assistance function which assists a driver of the intelligent vehicle 1 to drive. The autonomous driving module 4 may be an independent apparatus, or a module disposed in the data processing apparatus 3. When finally receiving a fusion result, the autonomous driving module 4 may control, based on received information sent by the data processing apparatus 3, the intelligent vehicle 1 to adjust the driving parameter, to implement the driver assistance function.

Specifically, in the data processing apparatus 3 provided in this embodiment, a plurality of virtual machines 31 are disposed, and the virtual machines 31 are in a one-to-one correspondence with the plurality of sensor groups 2 disposed in the intelligent vehicle 1. For example, as shown in FIG. 7, a total of N sensor groups 2 marked as 1 to N are disposed on the intelligent vehicle 1, and a total of N virtual machines 31 also marked as 1 to N are disposed in the data processing apparatus 3, where the N sensors groups are connected to the N virtual machines in a one-to-one correspondence. Optionally, the plurality of virtual machines 31 may run on an operating system of the data processing apparatus 3. Types and specific implementations of the plurality of virtual machines may be the same or different. Principles and implementations of the virtual machines are not limited in this application. Each virtual machine may be configured to implement different functions, and the plurality of virtual machines are independent of each other, and do not affect each other when implementing different functions.

In the embodiment shown in FIG. 7, each virtual machine 31 connected to the sensor group 2 may be configured to further analyze and process detection data obtained by the sensor group 2 connected to the virtual machine 31, and obtain an output result corresponding to the sensor group 2. In a specific implementation, each virtual machine 31 includes one first machine learning model. After the virtual machine 31 obtains detection data of a corresponding sensor group, the detection data may be specifically used as an input of the first machine learning model. After the detection data is analyzed and output by the first machine learning model, obtained detection data is used as an output result.

For example, FIG. 8 is a schematic diagram of a structure of virtual machines according to this application. In an example shown in FIG. 8, on the basis of FIG. 7, three virtual machines 31 are disposed in the data transmission apparatus, and the three virtual machines 31 are respectively connected to sensor groups 2 marked as 1 to 3. Each virtual machine 31 includes one first machine learning model. The first machine learning model may be a branch neural network model, and a structure of the first machine learning model may be a basic structure of the machine learning model shown in FIG. 2. After the virtual machine 31 obtains detection data of a corresponding sensor group 2, the detection data is used as an input of the branch neural network model, and after calculation by an intermediate layer, a probability value output from an output layer may be used as an output result, that is, an output result corresponding to the detection data of the sensor group 2. For example, when a sensor group is a camera, detection data obtained by the sensor group is an image of a place in front of the intelligent vehicle that is captured by the camera. After the image is input into the branch neural network model in the virtual machine as the detection data, and calculation is performed by the intermediate layer, the machine learning model outputs, by using the output layer of the machine learning model, a probability value used to indicate that there is an obstacle in the image of the place in front of the intelligent vehicle, or a probability value used to indicate a position of the obstacle in front of the intelligent vehicle.

In addition, because the plurality of sensor groups 2 are disposed on the intelligent vehicle, the branch neural network model in each virtual machine 31 outputs an output result based on detection data of the corresponding sensor group 2 connected to the virtual machine. To perform fusion processing on output results corresponding to the different sensor groups 2, the data processing apparatus 3 provided in this application further includes a second machine learning model 32 that is configured to fuse the output results obtained by the plurality of virtual machines 31 through calculation, to obtain a fusion output result that may be used to indicate driving parameter information of the intelligent vehicle, and send the fusion output result to the autonomous driving module 4. Optionally, in this embodiment of this application, the structure of the early fusion network shown in FIG. 3 is used as an example, and the feature fusion module 32 is disposed. It may be understood that the feature fusion module may use the structure of the late fusion network shown in FIG. 4 or the structure of the intermediate fusion network shown in FIG. 5A and FIG. 5B.

For example, still in the example shown in FIG. 8, the second machine learning model 32 may be a fusion neural network model, and a structure of the second machine learning model 32 may also be the basic structure of the machine learning model shown in FIG. 2. In this case, after receiving output results that are corresponding to the sensor groups marked as 1 to 3 and that are sent by the three virtual machines 31 running on the operating system, the second machine learning model 32 uses the three output results as inputs of the fusion neural network model. After calculation is performed by the intermediate layer, a fusion output result output from the output layer may be a probability value, where the probability value may be used to indicate driving parameter information of the intelligent vehicle. For example, when the sensor group 1, the sensor group 2, and the sensor group 3 respectively generate detection data based on environment information in front of the vehicle, three different output results are obtained after feature analysis is performed on the detection data of each sensor group by a corresponding virtual machine 31. Although the three output results are all used to indicate a position of another vehicle in front, there may be differences in expressions and accuracy. Therefore, by using the fusion neural network model 32, the three output results may be fused, and the final fusion output result is obtained based on all the three output results. Therefore, the driving parameter information of the intelligent vehicle may be accurately indicated.

Finally, after receiving the fusion output result sent by the data processing apparatus 3, the autonomous driving module 4 may directly adjust or indicate the driving parameter information of the intelligent vehicle to the driver, to implement the function of assisting driving of the intelligent vehicle by the data processing apparatus. For example, the autonomous driving module 4 may directly control a driving direction, a driving speed, or the like of the intelligent vehicle; or the autonomous driving module 4 may give, by using a visualized interface provided by a device, for example, the in-vehicle terminal, a prompt of a driving speed, a driving direction, or the like indicated by the fusion output result to the driver of the intelligent vehicle.

Optionally, in the embodiments shown in FIG. 7 and FIG. 8, the second machine learning model 32 may run in the operating system of the data processing apparatus 3, that is, the plurality of virtual machines 31 and the second machine learning model 32 simultaneously run in the operating system of the data processing apparatus 3. Each virtual machine and the second machine learning model are logically equal. Interaction between the virtual machines 31 and the second machine learning model 32 may be understood as interaction between the virtual machines 31 and a host on which the virtual machines 31 are located. Based on a parallel calculation structure used in interaction between virtual machines and a host in a virtual machine technology, the virtual machines may be parallel and do not need to interact. Therefore, there is no extra efficiency overhead, and no calculation delay is increased. A delay caused by the interaction between the virtual machines and the host is low or even negligible, so that a delay in sending the output results by the virtual machines 31 to the second machine learning model 32 is also low.

When such a structure as the first machine learning models and the second machine learning model are disposed in the data processing apparatus provided in FIG. 7 or FIG. 8 is applied to the embodiment shown in FIG. 6, the entire machine learning model stored in the data processing apparatus may be equivalently split into the plurality of branch neural network models (the first machine learning models) and one fusion neural network model (the second machine learning model). Further, in the data processing apparatus, the plurality of different virtual machines are disposed to separately store the plurality of branch neural network models, so that each branch neural network model performs calculation only in the virtual machine in which the branch neural network model is stored. Externally visible parts of each virtual machine are only the input detection data and the output result. It may be understood that the entire machine learning model in the data processing apparatus is split into different parts (the branch neural network models), and the different parts run in the different virtual machines.

It can be learned that the data processing apparatus provided in this application may obtain, by using the machine learning model and based on the detection data of the sensors, the driving parameter information used to indicate the intelligent vehicle, to implement the driver assistance function. To further ensure security of the machine learning model in the data processing apparatus, the plurality of independent virtual machines are disposed to store the plurality of branch neural network models. The plurality of virtual machines respectively perform feature analysis on the detection data of the different corresponding sensor groups and output the results, and then the plurality of virtual machines send the obtained output results to the fusion neural network model. The fusion neural network model uses the output results of all the plurality of virtual machines as inputs, and performs feature fusion to obtain the fusion output result, which may be used to indicate the driving parameter information of the intelligent vehicle.

Therefore, when an attacker is to steal the machine learning model stored in the data processing apparatus by a supplier, in addition to breaking the operating system of the data processing apparatus to obtain the fusion neural network model, the attacker needs to further attack the plurality of virtual machines in the data processing apparatus one by one, and can steal the entire machine learning model in the data processing apparatus only after the branch neural network models in all the virtual machines are obtained by breaking all the virtual machines. When a quantity of sensor groups is large, a quantity of virtual machines disposed in the data processing apparatus is large, and a quantity of virtual machines that the attacker needs to break also increases, which undoubtedly increases difficulty of stealing the entire machine learning model, so that the attacker is less likely to steal the machine learning model in the data processing apparatus. Therefore, security performance of the machine learning model stored in the data processing apparatus is improved.

In addition, in the data processing apparatus provided in this embodiment, the machine learning model is protected by adding the virtual machines. Because only an operating environment of the virtual machines is different, compared with the manner of protecting the machine learning model by performing encryption in the first current technology, a calculation workload of the machine learning model does not increase, and calculation accuracy of the machine learning model is not affected. Compared with the manner of protecting the machine learning model by storing the entire machine learning model in TEE in the second current technology, data exchange in calculation of the machine learning model does not increase because computing power and storage space of the virtual machines are larger than those of the TEE, and there is no need to repeatedly extract data from the TEE during the calculation of the machine learning model and return a result.

Therefore, according to the data processing apparatus provided in this embodiment, the machine learning model in the data processing apparatus is split into a plurality of parts which are stored into the plurality of different virtual machines respectively, so that the plurality of different virtual machines run independently and provide protection. In addition, while the plurality of virtual machines provide protection for the machine learning model, no extra calculation overhead, time overhead, or data exchange is incurred in the calculation of the machine learning model, and therefore a delay in implementing the driver assistance function by the machine learning model is reduced. As a result, both the security performance and calculation efficiency of the data processing apparatus are ensured.

Figure 9:
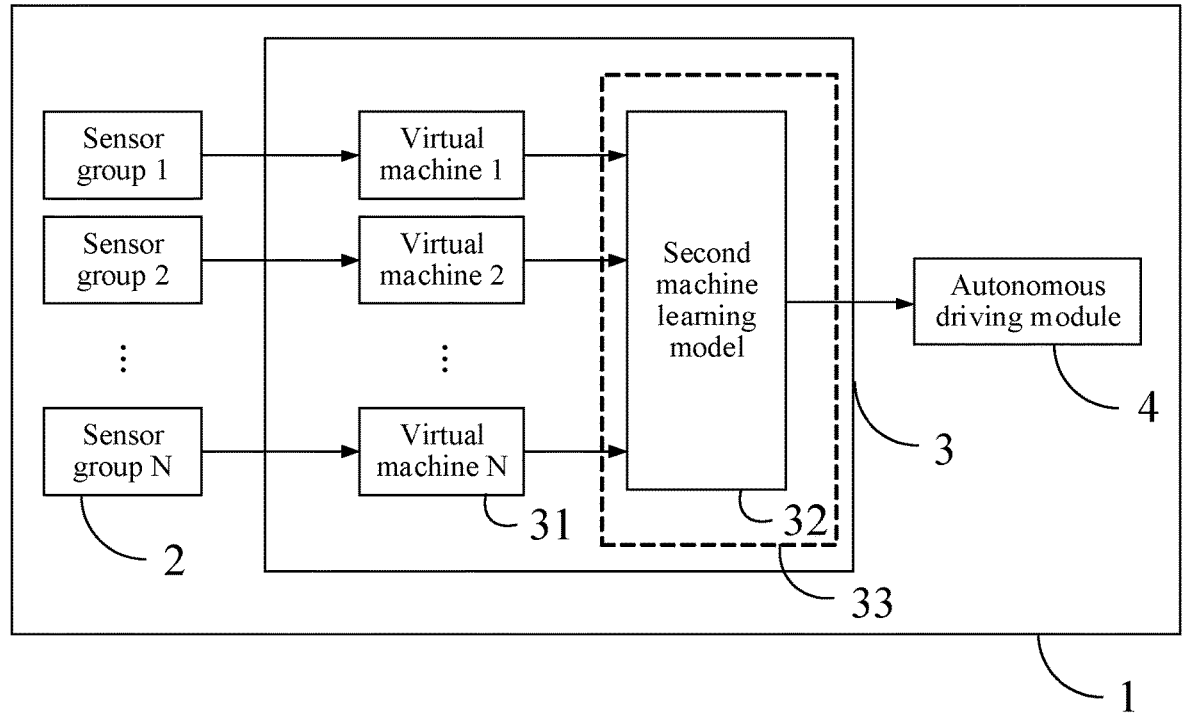
FIG. 9 is a schematic diagram of a structure of a data processing apparatus according to an embodiment of this application.

Further, based on the data processing apparatus provided in the embodiment shown in FIG. 7 or FIG. 8, the second machine learning model may alternatively be disposed in a virtual machine of the operating system, and the virtual machine configured to store the second machine learning model may be marked as a fusion virtual machine. For example, FIG. 9 is a schematic diagram of a structure of the data processing apparatus according to an embodiment of this application. In the embodiment shown in FIG. 9, the data processing apparatus 3 includes the plurality of virtual machines 31, and further includes a fusion virtual machine 33. The fusion virtual machine 33 stores the second machine learning model 32. In this case, the plurality of virtual machines 31 and the fusion virtual machine 33 may simultaneously run in the operating system of the data processing apparatus 3. The plurality of virtual machines 31 and the fusion virtual machine 33 are logically parallel to each other, and run independently without affecting each other.

Therefore, the data processing apparatus provided in this embodiment protects the branch neural network models by using the plurality of virtual machines, and further protects the fusion neural network model by using the fusion virtual machine. Although a delay caused by interaction between the plurality of virtual machines and the fusion virtual machine is introduced, the delay in the data processing apparatus is still relatively small, compared with that in the current technology. Therefore, by respectively putting the branch neural network models and the fusion neural network model that are obtained by splitting the entire machine learning model into the different virtual machines for storage and calculation, the security of the entire machine learning model is further ensured, and a calculation delay of the machine learning model may be reduced, compared with that in the current technology. In addition, higher security performance and specific calculation efficiency of the data processing apparatus are achieved.

Optionally, in the data processing apparatuses shown in FIG. 7 to FIG. 9, a manner of generating the machine learning model is that the entire machine learning model is provided by a supplier of the data processing apparatus. In another generating manner, the branch neural network models in the virtual machines may be provided by suppliers of different sensor groups, and the fusion neural network model may be obtained through joint training by the supplier of the data processing apparatus based on the branch neural network models provided by the suppliers of the different sensor groups. In this case, the suppliers of sensors and the supplier of the data processing apparatus may share training data used to respectively train the machine learning models.

For example, the machine learning model shown in FIG. 8 is used as an example. A supplier of the sensor group 1 may drive the intelligent vehicle on a road, and collect detection data of all sensors in the sensor group in different road conditions. In addition, driving parameter information, such as a driving direction and a driving speed, corresponding to driver assistance policies that need to be performed in the foregoing different road conditions is collected or manually marked. The data collected by the supplier of the sensor group 1 is marked as a training dataset 1, where the training dataset 1 includes correspondences between the detection data of the sensor group and the driving parameter information at different time points. Similarly, data collected by a supplier of the sensor group 2 is marked as a training dataset 2, data collected by a supplier of the sensor group 3 is marked as a training dataset 3, and data collected by the supplier of the data processing apparatus is marked as a training dataset 4. The foregoing training datasets 1 to 4 may be stored in a same network server in a manner of, for example, uploading to a server. When each supplier subsequently trains the respective machine learning model, the training datasets that are stored in the server and that are collected by all the suppliers may be used. For example, the suppliers of the sensor groups 1 to 3 may train, by using the training datasets 1 to 4, the branch neural network models in the virtual machines corresponding to the respective sensor groups, and the supplier of the data processing apparatus may train the fusion neural network model also based on the training datasets 1 to 4.

Therefore, in this embodiment, a data volume for training the machine learning models may be enriched, and manpower and material resources invested by each supplier to obtain the training data are reduced. In addition, the supplier of each sensor group respectively trains the corresponding machine learning model. Although the machine learning models are stored in the plurality of virtual machines of one data processing apparatus, because the different virtual machines are disposed independently of each other, the different virtual machines cannot obtain a machine learning model corresponding to another sensor group from each other, which ensures privacy of the machine learning models between the suppliers of the machine learning models corresponding to the sensor groups.

Figure 10:
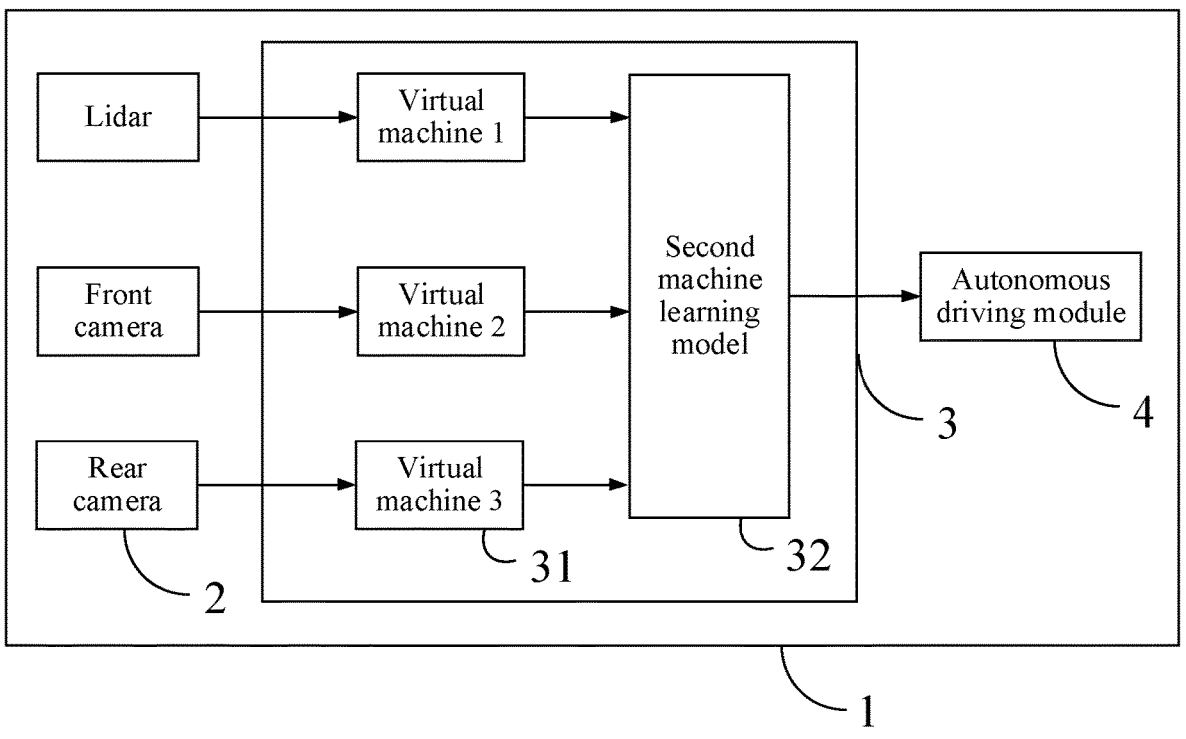
FIG. 10 is a schematic diagram of a structure of a data processing apparatus according to an embodiment of this application.
Figure 11:
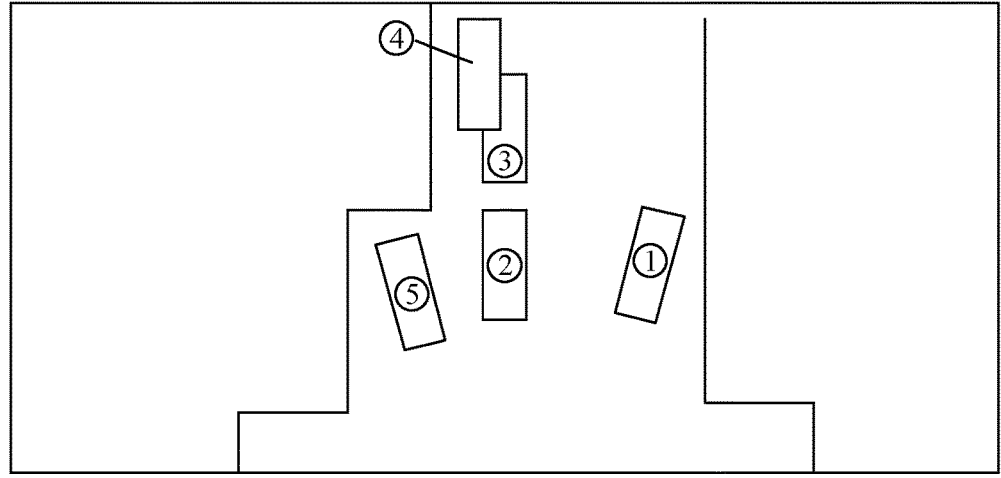
FIG. 11 is detection data of lidar.
Figure 12:
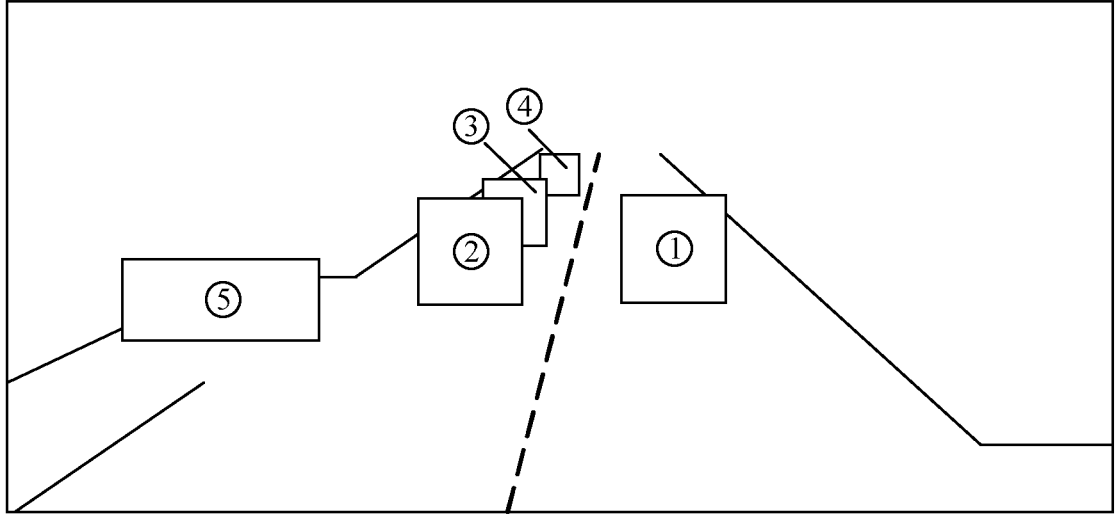
FIG. 12 is detection data of a front camera.
Figure 13:
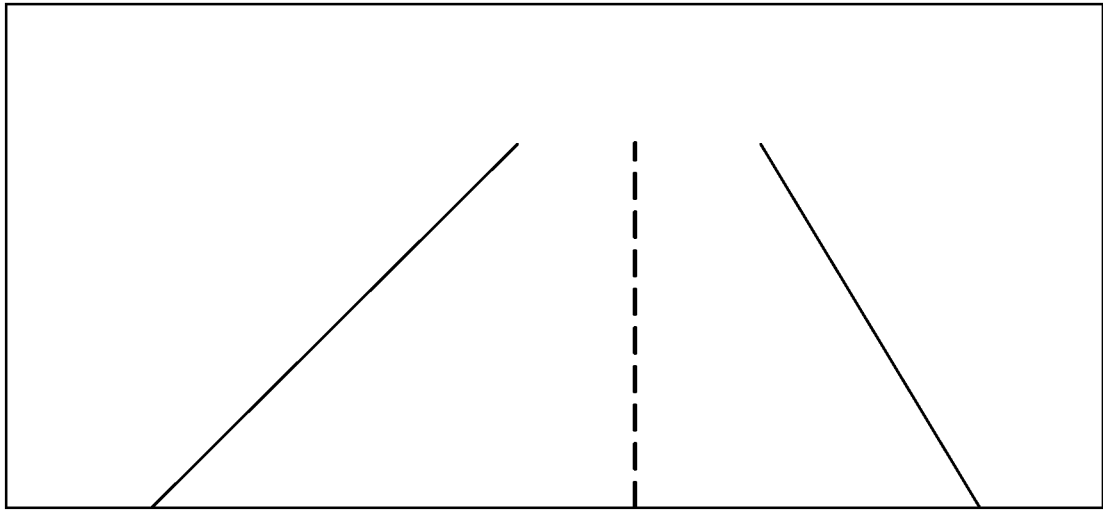
FIG. 13 is detection data of a rear camera.

For example, with reference to a specific embodiment, the following describes a process of implementing the driver assistance function by the data processing apparatus provided in this application. FIG. 10 is a schematic diagram of a structure of the data processing apparatus according to an embodiment of this application. Three sensor groups are disposed on an intelligent vehicle 1. The three sensor groups each include one sensor: lidar, a front camera, and a rear camera respectively. Three virtual machines are disposed in the data processing apparatus 3, and are respectively connected to the three sensor groups. The three virtual machines respectively use branch neural network models in the virtual machines to use detection data of the sensor groups to obtain output results. For example, FIG. 11 is detection data of the lidar. After feature analysis of a virtual machine marked as 1, an output result that may be obtained is that there are five vehicles marked as □ to □ and locations of the vehicles in FIG. 11. FIG. 12 is detection data of the front camera. After feature analysis of the virtual machine marked as 2, an output result that may be obtained is that there are five vehicles marked as □ to □ and locations of the vehicles in FIG. 12. FIG. 13 is detection data of the rear camera. After feature analysis of the virtual machine marked as 3, an output result that may be obtained is shown in FIG. 13, that is, there is no other vehicle behind the intelligent vehicle. If a fusion output result is determined based on only an output result obtained from detection data corresponding to any one of the three sensor groups, accuracy of a driving parameter may be affected due to exceptions such as line of sight blocking and resolution, and then performance of driver assistance may be reduced. Therefore, after the output results corresponding to the three sensor groups are respectively obtained by using the three virtual machines, the virtual machines marked as 1 to 3 respectively output the output results in FIG. 11 to FIG. 13 to a second machine learning model 32. The second machine learning model 32 combines the three output results to obtain a joint fusion output result. As a result, driving parameter information of the intelligent vehicle may be indicated based on the fusion output result obtained after the output results of the three sensor groups are fused, so that the data processing apparatus may determine more completely the driving parameter based on the fusion output result of all the sensor groups, to ensure that when an exception, for example, a sensor being blocked occurs, more accurate driving parameter information may still be indicated by the fusion output result obtained after the output results of the plurality of sensors are fused. For example, the second machine learning model 32 may obtain the fusion output result based on the obtained output results corresponding to the plurality of sensor groups in FIG. 11 to FIG. 13, and send the fusion output result to an autonomous driving module 4. The fusion output result may indicate driving parameter information that the intelligent vehicle maintains a current driving direction and decelerates to 40 km/h.

This application further provides a data processing method, which may be applied to the data processing apparatus in the foregoing embodiments of this application. Specifically, FIG. 14 is a schematic flowchart of a data processing method according to an embodiment of this application. The method includes the following steps.

S101: Obtain, by using a plurality of virtual machines, detection data of a sensor group corresponding to each virtual machine, where each virtual machine includes a first machine learning model.

Specifically, the data processing apparatus provided in this application includes the plurality of virtual machines, and a machine learning model is split into different parts that are respectively stored in the plurality of virtual machines. The virtual machines are in a one-to-one correspondence with a plurality of sensor groups disposed in an intelligent vehicle. In this case, in S101, the data processing apparatus used as an execution owner first obtains detection data of the plurality of corresponding sensor groups by using the plurality of virtual machines respectively.

S102: Obtain a plurality of output results by using the detection data of the sensor group corresponding to each virtual machine as an input of the first machine learning model in the virtual machine.

Subsequently, after the plurality of virtual machines obtain the detection data of the plurality of corresponding sensor groups, for each virtual machine, the detection data may be used as the input of the first machine learning model. After the detection data is analyzed and output by the first machine learning model, obtained detection data is used as an output result.

S103: Obtain a fusion output result by using the plurality of output results of the first machine learning models in the plurality of virtual machines as inputs of a second machine learning model, where the fusion output result indicates driving parameter information of the intelligent vehicle.

Specifically, because the first machine learning model in each virtual machine outputs an output result based on the detection data of the corresponding sensor group connected to the virtual machine, to perform fusion processing on the output results corresponding to the different sensor groups, the data processing apparatus provided in this application further includes the second machine learning model. In this case, in S103, the data processing apparatus used as the execution owner may be configured to fuse the output results obtained through calculation of the plurality of virtual machines, to obtain the fusion output result indicating the driving parameter information of the intelligent vehicle, and send the fusion output result to an autonomous driving module.

In conclusion, in the data processing method provided in this embodiment, because the plurality of virtual machines are disposed in the data processing apparatus, and the machine learning model is split into the different parts that are stored in the plurality of virtual machines respectively, which increase difficulty of breaking the data processing apparatus and obtaining the machine learning model in the data processing apparatus, an attacker needs to break all the virtual machines to obtain the machine learning model in the data processing apparatus in reverse. Therefore, to some extent, protection of the machine learning model in the data processing apparatus is implemented, and security of the machine learning model is improved. In addition, according to the data processing method provided in this application, the security of the machine learning model can be ensured without increasing excessive calculation overheads and a delay of the machine learning model.

Optionally, the second machine learning model may be disposed in a fusion virtual machine. In this case, before S103 shown in FIG. 14, the method further includes: Obtain the plurality of output results of the first machine learning models in the plurality of virtual machines by using the fusion virtual machine.

Therefore, in this embodiment, the second machine learning model used to fuse the output results of the plurality of virtual machines to obtain the fusion output result is protected by using the fusion virtual machine. Although a delay caused by interaction between the virtual machines and the fusion virtual machine is introduced by using the data processing method provided in this embodiment, the delay in the data processing method is still relatively small compared with that in a current technology. Therefore, by respectively putting the first machine learning models and the second machine learning model that are obtained by splitting the entire machine learning model into the different virtual machines, the security of the entire machine learning model is further ensured, and the calculation delay of the machine learning model may be reduced, compared with that in the current technology. In addition, higher security performance and specific calculation efficiency of the data processing apparatus are achieved.

Optionally, the first machine learning model includes a branch neural network model, and the second machine learning model includes a fusion neural network model.

Optionally, in this embodiment, the branch neural network model included in each virtual machine is obtained through training based on a training dataset by a supplier of the sensor group corresponding to the virtual machine; and the training dataset includes a plurality of correspondences, where in each correspondence, detection data of a sensor group of the intelligent vehicle corresponds to a piece of driving parameter information.

Optionally, the fusion neural network model is obtained through training based on the training dataset by a supplier of the data processing apparatus. The correspondences included in the training dataset are provided by the supplier of the data processing apparatus and suppliers of the plurality of sensor groups.

The data processing method provided in this embodiment may be executed by a corresponding data processing apparatus provided in the foregoing embodiments of this application. Implementations and principles of the data processing method are the same, and details are not described again.

In addition, an embodiment of this application further provides a structure of another electronic device applicable to implement a data processing apparatus provided in this application. FIG. 15 is a schematic diagram of a structure of the electronic device according to an embodiment of this application. As shown in FIG. 15, the electronic device 1500 may include a communication interface 1510 and a processor 1520. Optionally, the electronic device 1500 may further include a memory 1530. The memory 1530 may be disposed inside the electronic device, or may be disposed outside the electronic device.

For example, operations performed by the data processing apparatus in FIG. 14 may be implemented by the processor 1520. The processor 1520 sends data by using the communication interface 1510, and is configured to implement any method performed by the data processing apparatus in FIG. 14. In an implementation process, steps in a processing procedure may complete, by using an integrated logic circuit of hardware in the processor 1520 or instructions in a form of software, the method performed by the data processing apparatus in FIG. 7 to FIG. 10. For brevity, details are not described herein again. Program code executed by the processor 1520 to implement the foregoing method may be stored in the memory 1530. The memory 1530 is connected to the processor 1520, for example, a coupling connection.

Some features of this embodiment of this application may be completed/supported by the processor 1520 executing program instructions in the memory 1530 or software code. Software components loaded on the memory 1530 may be summarized functionally or logically, for example, the virtual machines and the second machine learning model shown in FIG. 7, and the fusion virtual machine shown in FIG. 9.

Any communication interface in embodiments of this application may be a circuit, a bus, a transceiver, or another apparatus that may be configured to exchange information, for example, the communication interface 1510 in the electronic device 1500. For example, the another apparatus may be a device connected to the electronic device. For example, the another apparatus may be a sensor or an autonomous driving module.

In embodiments of this application, the processor may be a general-purpose processor, a digital signal processor, an application-specific integrated circuit, a field-programmable gate array or another programmable logic device, a discrete gate or transistor logic device, or a discrete hardware component, and can implement or perform the methods, steps, and logical block diagrams disclosed in embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

Couplings in embodiments of this application are indirect couplings or communication connections between apparatuses and modules, or between modules. The couplings may be electrical, mechanical, or in other form, and are used for information exchange between the apparatuses and the modules, or between the modules.

The processor may operate with the memory. The memory may be a nonvolatile memory, for example, a hard disk drive (HDD) or a solid-state drive (SSD), or may be a volatile memory, for example, a random access memory (RAM). The memory is any other medium that can carry or store expected program code in a form of an instruction structure or a data structure and that can be accessed by a computer, but is not limited thereto.

A specific connection medium between the communication interface, the processor, and the memory is not limited in this embodiment of this application. For example, the memory, the processor, and the communication interface may be connected by using a bus. The bus may be classified into an address bus, a data bus, a control bus, and the like.

This application further provides a storage medium, where the storage medium stores a computer program, and when the computer program is run on a computer, the computer is enabled to perform any method performed by the data processing apparatus in embodiments of this application.

In embodiments of this application, "at least one" means one or more, and "a plurality of" means two or more. It may be understood that various numbers in embodiments of this application are merely used for differentiation for ease of description, and are not intended to limit the scope of the embodiments of this application. It may be understood that sequence numbers of the foregoing processes do not mean execution sequences in embodiments of this application. The execution sequences of the processes should be determined according to functions and internal logic of the processes, and should not be construed as any limitation on the implementation processes of the embodiments of this application.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. An apparatus disposed in an intelligent vehicle having a plurality of sensor groups disposed thereon and configured to detect ambient environment information, comprising:
    a processor; and
    a memory storing a plurality of machine learning models and computer readable instructions that when executed by the processor cause the apparatus to perform steps including:
    run a plurality of virtual machines, wherein each virtual machine comprises a first machine learning model and obtain, from the first machine learning model, detection data of a corresponding sensor group in the plurality of sensor groups, and obtain an output result by using the detection data as an input of the first machine learning model; and

obtain output results, from a second machine learning model, of the plurality of virtual machines, and obtain a fusion output result by using the output results of the plurality of virtual machines as inputs, wherein the fusion output result indicates driving parameter information of the intelligent vehicle.

2. The apparatus according to claim 1, wherein the processor is configured to run a fusion virtual machine, wherein each of the plurality of virtual machines is connected to the fusion virtual machine, and the fusion virtual machine comprises the second machine learning model.

3. The apparatus according to claim 2, wherein the first machine learning model comprises a branch neural network model, and the second machine learning model comprises a fusion neural network model.

4. The apparatus according to claim 3, wherein the processor is configured to train the branch neural network model comprised in each virtual machine based on a training dataset by a supplier of the sensor group corresponding to the virtual machine, and the training dataset comprises a plurality of correspondences, wherein in each correspondence detection data of a sensor group of the intelligent vehicle corresponds to a piece of driving parameter information.

5. The apparatus according to claim 4, wherein the processor is configured to train the fusion neural network model based on the training dataset from a supplier of the data processing apparatus.

6. The apparatus according to claim 5, wherein the processor is configured to use the correspondences comprised in a training dataset provided by the supplier of the data processing apparatus and suppliers of the plurality of sensor groups.

7. A method performed by a data processing apparatus disposed in an intelligent vehicle having a plurality of sensor groups disposed thereon for detecting ambient environment information, the method comprising:

obtaining detection data of each sensor group of the plurality of sensor groups, wherein each sensor group corresponds to a virtual machine of a plurality of virtual machines run by a processor of the data processing apparatus, wherein each virtual machine of the plurality of virtual machines comprises a first machine learning model;

obtaining a plurality of output results of the first machine learning models in the plurality of virtual machines by inputting the detection data of each sensor group to the first machine learning model in the corresponding virtual machine; and obtaining a fusion output result by using the plurality of output results of the first machine learning models in the plurality of virtual machines as inputs of a second machine learning model applied by the processor, wherein the fusion output result indicates driving parameter information of the intelligent vehicle.

8. The method according to claim 7, wherein the second machine learning model is disposed in a fusion virtual machine, and wherein before the step of obtaining the fusion output result, the method further comprises:

obtaining the plurality of output results of the first machine learning models in the plurality of virtual machines by using the fusion virtual machine.

9. The method according to claim 8, wherein the first machine learning model comprises a branch neural network model, and the second machine learning model comprises a fusion neural network model.

10. The method according to claim 9, further comprising:

training the branch neural network model comprised in each virtual machine ng based on a training dataset by a supplier of the sensor group corresponding to the virtual machine, wherein the training dataset comprises a plurality of correspondences, wherein in each correspondence detection data of a sensor group of the intelligent vehicle corresponds to a piece of driving parameter information.

11. The method according to claim 10, further comprising:

training the fusion neural network model based on the training dataset by a supplier of the data processing apparatus.

12. The method according to claim 11, further comprising:

using the correspondences comprised in the training dataset provided by the supplier of the data processing apparatus and suppliers of the plurality of sensor groups.

13. An intelligent vehicle, comprising:

a plurality of sensor groups; and a data processing apparatus comprising a processor configured to:

run a plurality of virtual machines, wherein each virtual machine comprises a first machine learning model and is configured to obtain detection data of a corresponding sensor group in the plurality of sensor groups, and obtain an output result by using the detection data as an input of the first machine learning model; and apply a second machine learning model to obtain output results of the plurality of virtual machines, and obtain a fusion output result by using the output results of the plurality of virtual machines as inputs of the second machine learning model, wherein the fusion output result indicates driving parameter information of the intelligent vehicle.

14. The intelligent vehicle according to claim 13, wherein the processor of the data processing apparatus is configured to:

run a fusion virtual machine, wherein each of the plurality of virtual machines is connected to the fusion virtual machine, and the fusion virtual machine comprises the second machine learning model.

15. The intelligent vehicle according to claim 14, wherein the first machine learning model comprises a branch neural network model, and the second machine learning model comprises a fusion neural network model.

16. The intelligent vehicle according to claim 15, wherein the processor of the data processing apparatus is configured to:

train the branch neural network model comprised in each virtual machine based on a training dataset by a supplier of the sensor group corresponding to the virtual machine, wherein the training dataset comprises a plurality of correspondences, wherein in each correspondence detection data of a sensor group of the intelligent vehicle corresponds to a piece of driving parameter information.

17. The intelligent vehicle according to claim 16, wherein the processor of the data processing apparatus is configured to:

train the fusion neural network model based on a training dataset by a supplier of the data processing apparatus.

18. The intelligent vehicle according to claim 17, wherein the correspondences comprised in the training dataset are provided by the supplier of the data processing apparatus and suppliers of the plurality of sensor groups.

* * * * *